(12) United States Patent
Au et al.

(10) Patent No.: US 9,392,487 B2
(45) Date of Patent: Jul. 12, 2016

(54) SYSTEMS AND METHODS FOR TRAFFIC-AWARE MEDIUM ACCESS SELECTION

(71) Applicant: Huawei Technologies Co., Ltd., Shenzhen (CN)

(72) Inventors: Kelvin Kar Kin Au, Kanata (CA); Petar Djukic, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 13/887,914

(22) Filed: May 6, 2013

(65) Prior Publication Data

US 2014/0328183 A1  Nov. 6, 2014

(51) Int. Cl.
*H04W 28/02* (2009.01)
*H04W 72/04* (2009.01)
(Continued)

(52) U.S. Cl.
CPC ...... *H04W 28/0284* (2013.01); *H04W 28/0236* (2013.01); *H04W 28/0268* (2013.01); *H04W 74/02* (2013.01); *H04W 72/1236* (2013.01)

(58) Field of Classification Search
CPC ..... H04W 74/00; H04W 74/02; H04W 74/04; H04W 72/04; H04W 72/12; H04W 74/002; H04W 74/08; H04W 76/043; H04W 80/04; H04W 92/10; H04L 47/14; H04L 1/1854
USPC .............. 370/229, 230.1, 235, 236, 252, 254, 370/329, 330, 343, 345, 349
See application file for complete search history.

(56) References Cited

U.S. PATENT DOCUMENTS 7,319,680 B2 *  1/2008  Cho .................. H04W 74/08
                                            370/329
8,576,784 B2 * 11/2013  L hr ................. H04L 5/0007
                                            370/329

(Continued)

FOREIGN PATENT DOCUMENTS

CN         101933295 A     12/2010
CN         102137453 A      7/2011
(Continued)

OTHER PUBLICATIONS

IEEE Standard for Information technology—Telecommunications and information exchange between systems—Local and metropolitan area networks—Specific requirements—Part 11: Wireless LAN Medium Access Control (MAC) and Physical Layer (PHY) Specifications Amendment 3: Enhancements for Very High Throughput in the 60 GHz Band, IEEE Std 802.11ad-2012 (Amendment to IEEE Std 802.11-2012, as amended by IEEE Std 802.11ae-2012 and IEEE Std 802.11aa-2012) pp. 1-628, Dec. 28 2012. doi: 10.1109/IEEESTD.2012.6392842.

(Continued)

*Primary Examiner* — Ahmed Elallam
(74) *Attorney, Agent, or Firm* — Slater Matsil, LLP

(57) ABSTRACT

Diverse traffic types can be efficiently communicated in a simultaneous manner by dynamically selecting between contention-based and scheduling-based media access control (MAC) communication schemes. Such a mechanism may be particularly beneficial in networks having a contention-based access resources and scheduling based access resources. Contention-based resources and scheduling based resources may occur over a common period, and may be orthogonal in the frequency domain and/or in the code domain. The dynamic selection may be based on a traffic characteristic or a network characteristic, and may be performed on a packet-by-packet basis. The selection criteria may be updated dynamically to adapt to changing network conditions, and may be communicated to the various transmitters via control channels or higher layer signaling.

17 Claims, 7 Drawing Sheets

(51) Int. Cl.
*H04W 74/02* (2009.01)
*H04W 74/04* (2009.01)
*H04W 74/08* (2009.01)
*H04W 72/12* (2009.01)

(56) References Cited

U.S. PATENT DOCUMENTS

| | | | |
|---|---|---|---|
| 2004/0117497 A1* | 6/2004 | Park | H04W 24/02 709/230 |
| 2005/0270975 A1 | 12/2005 | Meylan et al. | |
| 2006/0239292 A1* | 10/2006 | Kahana et al. | 370/437 |
| 2008/0095124 A1* | 4/2008 | Ramos et al. | 370/336 |
| 2008/0298252 A1 | 12/2008 | Yonge, III et al. | |
| 2008/0318607 A1 | 12/2008 | Torsner et al. | |
| 2009/0074007 A1 | 3/2009 | Yonge, III et al. | |
| 2009/0103483 A1* | 4/2009 | Higuchi | H04L 5/0005 370/329 |
| 2009/0103501 A1* | 4/2009 | Farrag et al. | 370/337 |
| 2009/0252145 A1* | 10/2009 | Meylan et al. | 370/348 |
| 2009/0268667 A1 | 10/2009 | Gandham et al. | |
| 2009/0310578 A1* | 12/2009 | Convertino et al. | 370/338 |
| 2010/0014423 A1* | 1/2010 | Furuskar et al. | 370/235 |
| 2010/0293286 A1* | 11/2010 | Nikkila et al. | 709/231 |
| 2011/0110229 A1* | 5/2011 | Himayat et al. | 370/230 |
| 2012/0182977 A1* | 7/2012 | Hooli | H04W 72/1278 370/336 |
| 2012/0213208 A1* | 8/2012 | Hsu et al. | 370/336 |
| 2013/0003650 A1* | 1/2013 | Han | H04B 7/155 370/315 |

FOREIGN PATENT DOCUMENTS

| | | |
|---|---|---|
| CN | 102469617 A | 5/2012 |
| EP | 1865738 A1 | 12/2007 |
| EP | 2153595 B1 | 4/2012 |

OTHER PUBLICATIONS

"Exalted WP3—LTE-M System D 3.3 Final Report on LTE-M algorithms and procedures." Retrieved Jul. 24, 2013 from http://www.ict-exalted.eu/fileadmin/documents/EXALTED_WP3_D3.3_v1.0.pdf, 159 pages.

International Search Report and Written Opinion received in International Application No. PCT/CN2014/076628 mailed Jul. 9, 2014, 15 pages.

* cited by examiner

US 9,392,487 B2

SYSTEMS AND METHODS FOR TRAFFIC-AWARE MEDIUM ACCESS SELECTION

TECHNICAL FIELD

The present invention relates generally to wireless communications, and in particular embodiments, to methods and systems for traffic-aware medium access selection.

BACKGROUND

In conventional wireless access networks, mobile devices operate in either a contention-based media access control (MAC) transmission mode or a contention-free MAC transmission mode. When operating in the contention-based MAC transmission mode, the mobile device communicates all traffic in accordance with a contention-based access technique. Likewise, when operating in the contention-free MAC transmission mode, the mobile device communicates all traffic using scheduling-based access. Each MAC transmission mode has its advantages and disadvantages. For instance, scheduling-based access often provides higher quality of service (QoS) than contention-based access, while contention-based access typically achieves lower latency times, particularly for small payload traffic.

As mobile device capability increases, it is likely that users may want to communicate diverse traffic types simultaneously. For instance, a user may want to communicate a first traffic flow (e.g., a high QoS traffic flow) using scheduling-based access at the same time as a second traffic flow (e.g., latency-intolerant/low-capacity data flow) using contention-based access. Presently, the mobile station would need to communicate both traffic flows using the same MAC transmission technique, depending on which MAC transmission mode the UE was operating in. Hence, new mechanisms for efficiently communicating diverse traffic types are desired.

SUMMARY OF THE INVENTION

Technical advantages are generally achieved, by embodiments of this disclosure which describe methods and systems for traffic-aware medium access selection.

In accordance with an embodiment, a method for communicating data using multiple media access control (MAC) access techniques is provided. In this example, the method includes obtaining a first traffic flow and a second traffic flow, and simultaneously communicating the first traffic flow and the second traffic flow over a network. The first traffic flow is communicated in accordance with a scheduling-based access MAC communication scheme, and the second traffic flow is communicating in accordance with a contention-based access MAC communication scheme. An apparatus for performing this method is also provided.

In accordance with another embodiment, a method for communicating control information is provided. In this example, the method includes determining media access control (MAC) selection criteria in accordance with conditions of a network, and communicating the MAC selection criteria to one or more mobile devices in the network. The MAC selection criteria specifies rules or parameters to be used by the mobile devices when determining whether to communicate traffic using a contention-based access MAC communication scheme or a scheduling-based access MAC communication scheme. An apparatus for performing this method is also provided.

In accordance with yet another embodiment, another method for communicating data using multiple media access control (MAC) access techniques is provided. In this example, the method includes obtaining a plurality of packets, determining, on a packet-by-packet basis, whether to communicate the plurality of packets using contention-based or scheduling-based access, and simultaneously communicating a first packet and a second packet over a network. The first packet is communicated in accordance with a scheduling-based access MAC communication scheme, and the second packet is communicated in accordance with a contention-based access MAC communication scheme.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Disclosed herein are techniques for simultaneously communicating traffic flows using both scheduling-based access and contention-based access MAC communication schemes. More specifically, aspects of this disclosure enable a mobile station to communicate a first traffic flow using a scheduling based access MAC communication scheme at the same time the mobile station communicates a second traffic flow using a contention-based access MAC communication scheme. Simultaneous transmission of both types is accomplished by simultaneously using different physical resources (for example: frequency, time, spreading code or any combination thereof). In embodiments, the mobile station may dynamically select between scheduling and contention based access for communicating a given traffic flow over the network. The mobile station may select the MAC communication scheme in accordance with a MAC selection criteria, which may include a characteristic of the traffic flow and/or a characteristic of the network. For instance, the MAC selection criteria may include a quality of service (QoS) requirement of the traffic flow (e.g., error rate, etc.), a latency requirement of the traffic flow, an amount of data carried by the traffic flow, an amount of overhead associated with the data flow, a congestion level of a contention-based access channel (e.g., as indicated by a back-off time or otherwise), a latency delay associated with a scheduling-based access channel, any other factor. The selection criteria may be obtained from a prior information of the mobile station, control information communicated by a controller/base-station, or a combination thereof.

Figure 1:
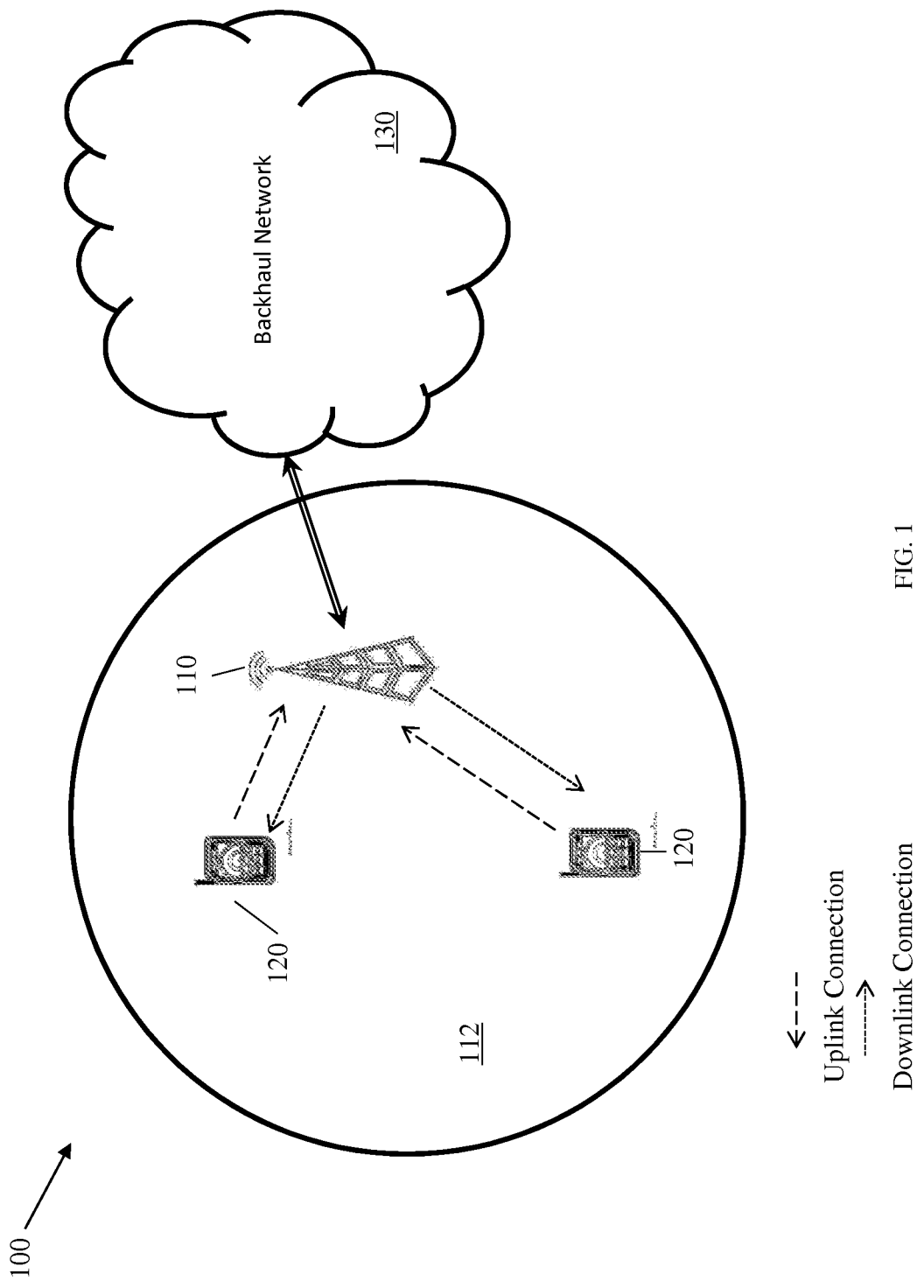
FIG. 1 illustrates diagram of a wireless network for communicating data.

FIG. 1 illustrates a network 100 for communicating data. The network 100 comprises an access point (AP) 110 having a coverage area 112, a plurality of user equipments (UEs) 120, and a backhaul network 130. The AP 110 may comprise any component capable of providing wireless access by, inter alia, establishing uplink (dashed line) and/or downlink (dotted line) connections with the UEs 120, such as a base station, an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the AP 110 and a remote end (not shown). In some embodiments, the network 100 may comprise various other wireless devices, such as relays, femtocells, etc.

Aspects of this disclosure provide a mechanism for dynamically selecting a contention-based or scheduling-based MAC communication scheme for communicating traffic over a network. In an embodiment, the wireless access network may include a first MAC communication channel having contention-based access, as well as a second MAC communication channel having scheduling based access. The contention-based access channel may operate in accordance with the Institute of Electrical and Electronics Engineers (IEEE) 802.1 lad (2012), which is incorporated by reference herein as if reproduced in its entirety.

Figure 2:
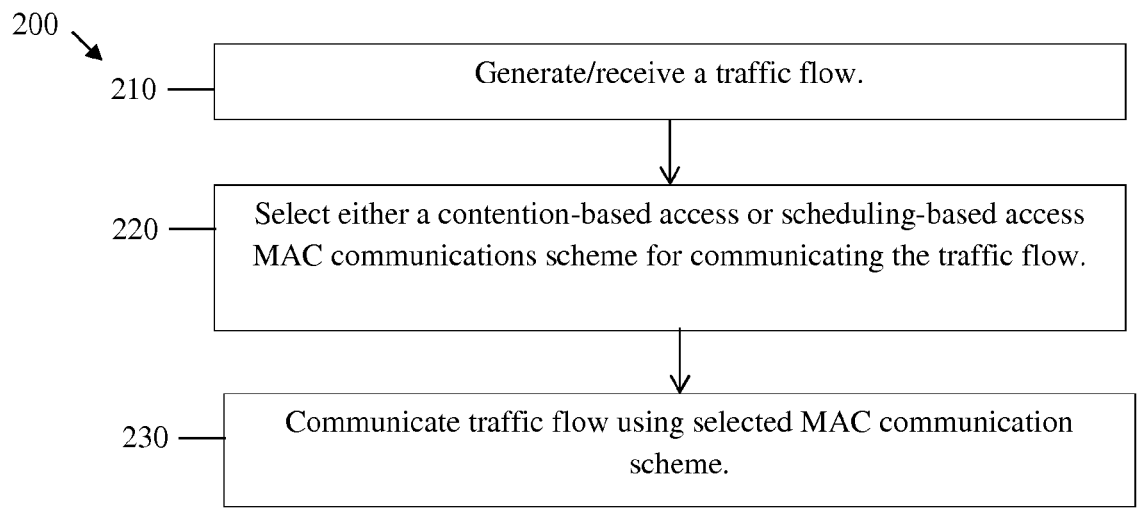
FIG. 2 illustrates a flowchart of an embodiment method for transmitting data.

FIG. 2 illustrates an embodiment method 200 for transmitting data, as may be performed by mobile station. As shown, the method 200 begins at step 210, where the mobile station generates and/or receives a traffic flow. Thereafter, the method 200 proceeds to step 220, where the mobile station selects either a contention-based access or scheduling-based access MAC communication scheme for communicating the traffic flow over a network. In an embodiment, the mobile station's selection may be based on MAC selection criteria. The MAC selection criteria may be communicated by a base station or may be a priori information of the mobile station. The MAC selection criteria may include a quality of service (QoS) requirement of the traffic flow (e.g., error rate, etc.), a latency requirement of the traffic flow, an amount of data carried by the traffic flow, an amount of overhead associated with the data flow, a congestion level of a contention-based access channel (e.g., as indicated by a back-off time or otherwise), a latency delay associated with a scheduling-based access channel, or any other factor.

Subsequently, the method 200 may proceed to be step 230, where the mobile station may communicate the traffic flow using the selected MAC communication scheme. In instances where the mobile station selected a scheduling-based MAC communication scheme, the mobile station may request uplink grant resources from the base station. In instances where the mobile station selects a contention-based MAC communication scheme, the mobile station may communicate the traffic flow without requesting uplink grant resources. For instance, the mobile station may use a "listen before talk" approach to communicating traffic over a contention-based communication channel.

Figure 3:
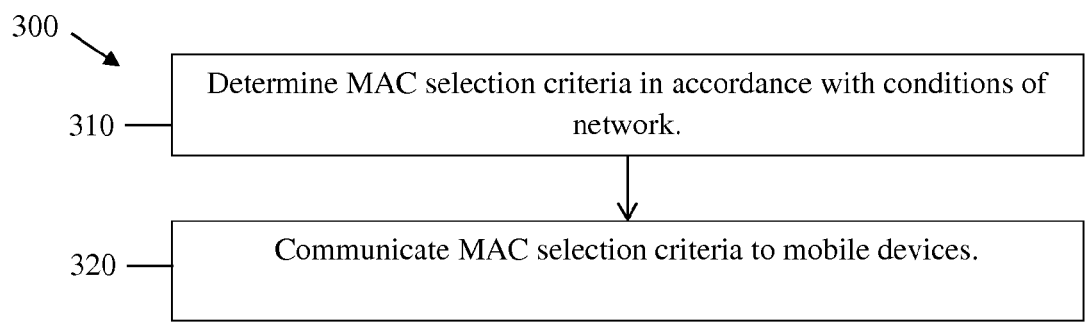
FIG. 3 illustrates a flowchart of an embodiment method for configuring MAC selection criteria.

In some embodiments, a communications controller or base station may communicate MAC selection criteria to the mobile station. Indeed, the base station may dynamically select the MAC selection criteria in accordance with conditions of the network. This may allow the access network to operate more efficiently and/or to adapt to changing network conditions, e.g., traffic types, load conditions, etc. FIG. 3 illustrates a method 300 for configuring MAC selection criteria, as might be performed by a base station. As shown, the method 300 may begin at step 310, where the base station determines MAC selection criteria in accordance with conditions of the network. Thereafter, the method 300 may proceed to step 320, where the base station communicates the MAC selection criteria to one or more mobile devices in the network. For instance, the base station may send a message to one or more mobile stations in the network. The message may be a broadcast message, a multicast message, or a unicast message. The message may be communicated via a control channel or, alternatively, through higher layer signaling, e.g., radio resource control (RRC) signaling.

Figure 4:
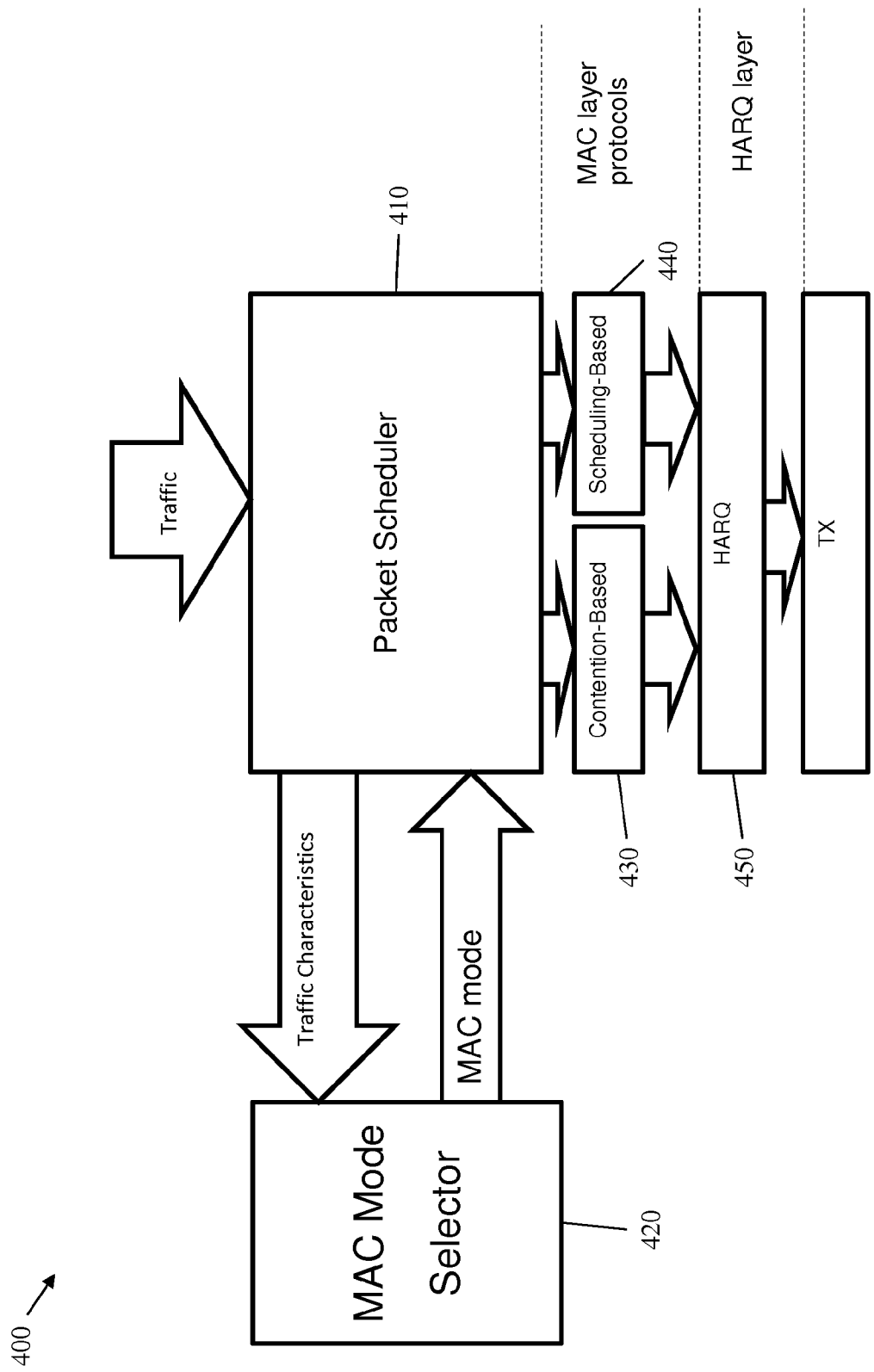
FIG. 4 illustrates a block diagram of an embodiment device for communicating data.

FIG. 4 illustrates a device 400 for transmitting traffic flows. As shown, the device 400 includes a packet scheduler 410, a MAC mode selector 420, a contention-based MAC communication module 430, a scheduling-based MAC communication module 440, and a hybrid automatic repeat request (HARQ) module 450. The packet scheduler 410 may be configured to receive traffic flows. Traffic flows may include one or more packets, and may be received concurrently with one another. In an embodiment, a traffic flow may include a single packet. The packet scheduler 410 may communicate traffic characteristics of the received traffic flows to the MAC mode selector 420. The MAC mode selector 420 may select a MAC mode for each of the traffic flows, and communicate the selected MAC modes to the packet scheduler 410.

The packet scheduler 410 may then forward traffic flows to either the contention-based MAC communication module 430 or the scheduling-based MAC communication module 440 depending on the select MAC mode for the respective traffic flows. The contention-based MAC communication module 430 may communicate received flows in accordance with a contention-based MAC communication technique, while the scheduling-based MAC communication module 440 may communicate received flows in accordance with a scheduling-based MAC communication technique. Accordingly, the traffic flows may then be forwarded to the HARQ module 450, which may provide HARQ functionality for the device 400. For instance, the HARQ module 450 may communicate acknowledgments and negative acknowledgments to confirm that transmissions were successfully received by the base station, as well as re-communicate transmissions that were not successfully received when necessary. In an embodiment, the MAC mode selector 420 is provided with a set of QoS characteristics by a base station. In another embodiment, if the traffic flows to MAC mode selection is fairly static, (e.g., one or more traffic flows are mapped to contention-based MAC for a period of time), then traffic flows may by-pass the packet scheduler altogether and be transmitted via the contention-based MAC directly. In embodiments, the contention-based MAC communication module 430 and the scheduling-based MAC communication module 440 communicate packet flows simultaneously.

Figure 5:
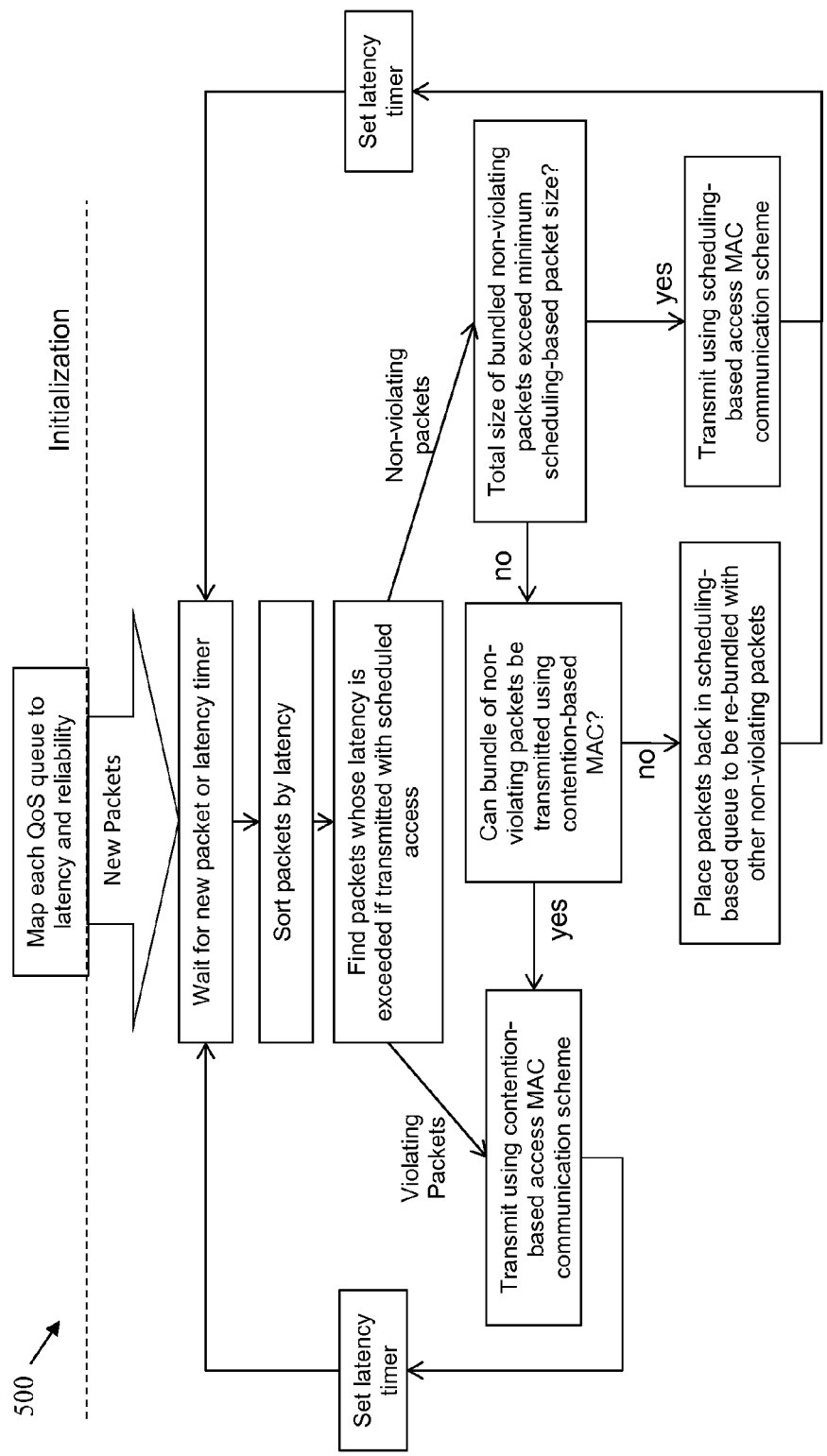
FIG. 5 illustrates a flowchart of an embodiment method for selecting MAC transmission modes for communicating data.

FIG. 5 illustrates a flowchart 500 for selecting a MAC transmission mode, as may be performed by a mobile station in accordance with embodiments of this disclosure. As shown, the mobile station may first map each quality of service (QoS) queue to latency and reliability criteria. Next, the mobile station may wait for a new packet to arrive or, alternatively, for a latency timer to expire. The mobile station may then sort packets in accordance with their respective latency requirements, and identify packets whose maximum latency would be exceeded if transmitted using a scheduling-based access MAC communication scheme. As discussed herein, packets whose maximum latency requirement would be exceeded if transmitted using scheduling-based access are considered to be violating packets, while packets whose maximum latency requirement would not be exceeded if transmitted using scheduling-based access are considered to be non-violating packets. The mobile station transmits violating packets using a contention-based access MAC communication scheme. The mobile station bundles non-violating packets, and then determines whether the bundle of non-violating packets exceeds a minimum scheduling-based packet size. If so, the bundle of non-violating packets is transmitting in accordance with the scheduling-based access MAC communication scheme. If the bundle is too small for scheduling-based transmission, then the mobile station determines whether the bundle of non-violating packets can be transmitted as contention based traffic. For instance, the bundle of non-violating packets may or may not have a traffic characteristics (e.g., QoS requirement, overhead, etc.) that prevents (or otherwise discourages) contention-based transmission. When possible, the bundle of non-violating packets is transmitted using contention-based access. If the bundle of non-violating packets cannot be transmitted using contention-based access, then the bundle is placed back into a scheduling-based transmission queue to be re-bundled with additional non-violating packets. Thereafter, the latency timer is reset.

Figure 6:
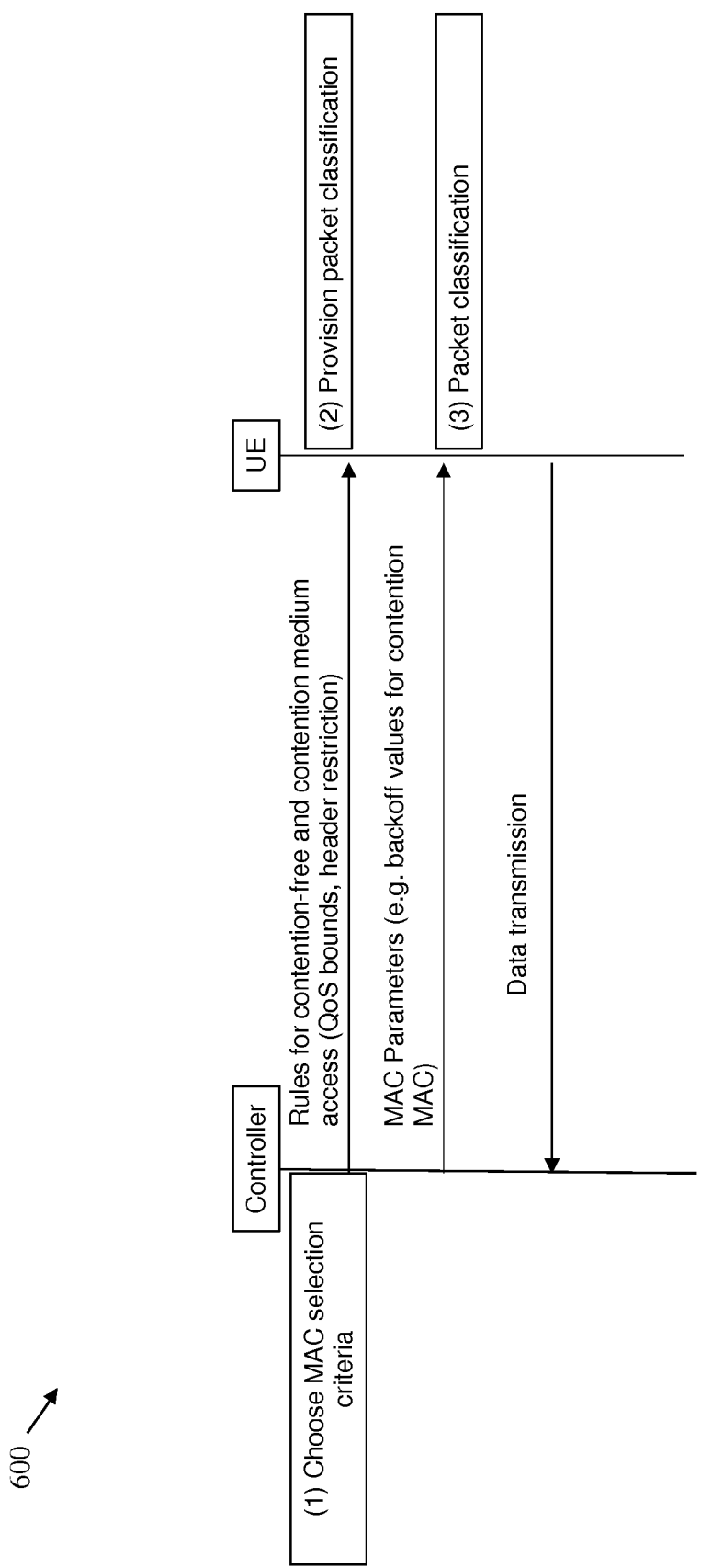
FIG. 6 illustrates a protocol diagram of an embodiment communications sequence for configuring MAC selection criteria.

FIG. 6 illustrates a protocol diagram 600 for communicating MAC selection criteria, as might take place between a controller and UE. As shown, the controller chooses MAC selection criteria before communicating the MAC selection criteria to the UE. In some embodiments, the controller may send rules for selecting between contention-based and scheduling-based transmission during an initialization period, which may allow the UE to provisionally classify packets, e.g., based on QoS bounds, header restriction, etc. Thereafter, the controller may communicate MAC selection parameters, which may allow the UE to perform packet classification. The messages sent from the controller to the UE may be broadcast, multicast, or unicast messages. After classifying the packets, the UE may perform data transmission.

Figures 7, 8:
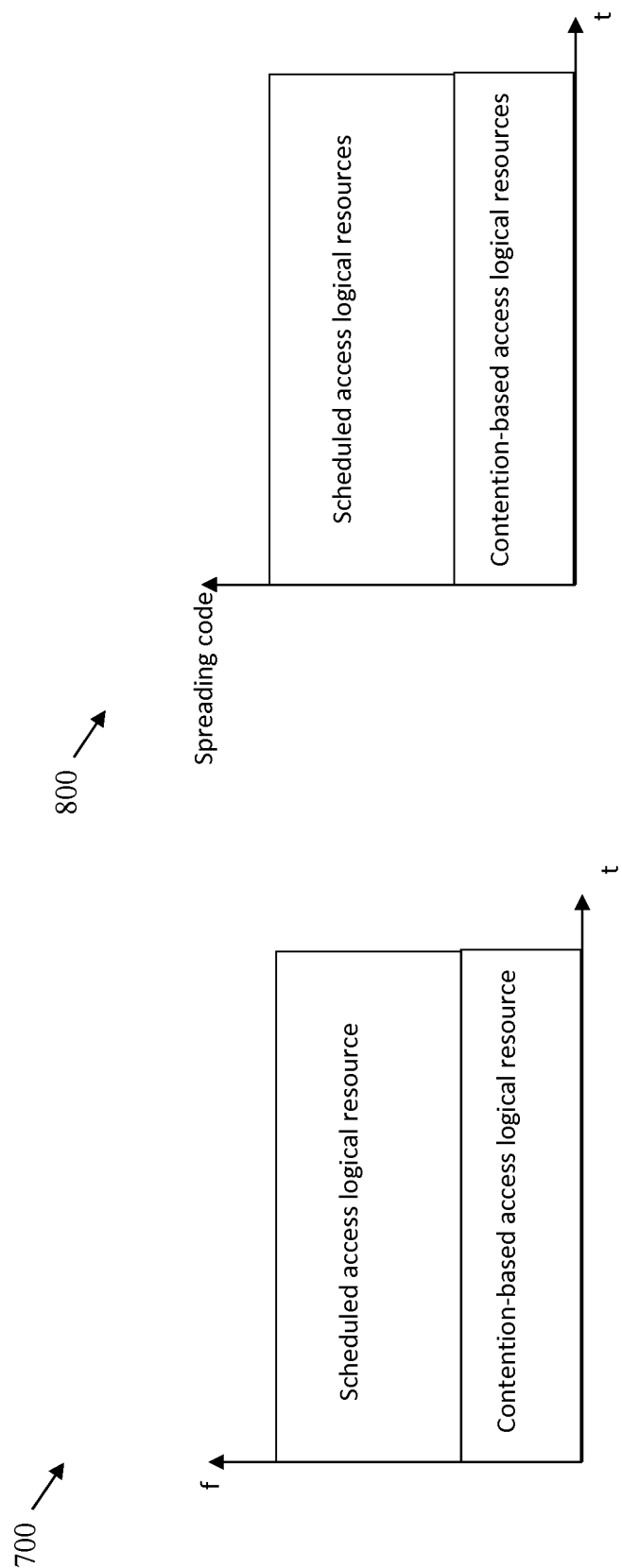
FIG. 7 illustrates a diagram of embodiment communications channels.
FIG. 8 illustrates a diagram of embodiment communications channels.

Scheduling-based access resources and contention-based access resources may be orthogonal in the frequency domain and/or in the code domain. FIG. 7 illustrates a transmission scheme 700 in which scheduling-based access logical resources and contention-based access logical resources are positioned on different frequency resources during a common time interval/period. FIG. 8 illustrates a transmission scheme 800 in which scheduling-based access logical resources and contention-based access logical resources are positioned on different spreading sequences/codes of a common time interval/period.

Figure 9:
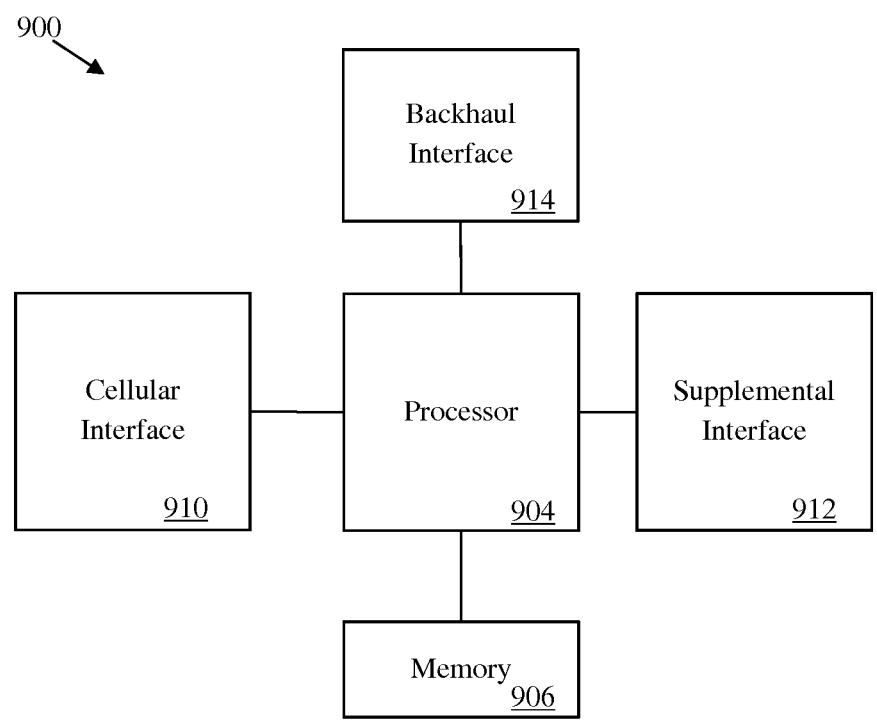
FIG. 9 illustrates a block diagram of an embodiment communications device.

FIG. 9 illustrates a block diagram of an embodiment of a communications device 900, which may be equivalent to one or more devices (e.g., UEs, NBs, etc.) discussed above. The communications device 900 may include a processor 904, a memory 906, a cellular interface 910, a supplemental wireless interface 912, and a backhaul interface 914, which may (or may not) be arranged as shown in FIG. 9. The processor 904 may be any component capable of performing computations and/or other processing related tasks, and the memory 906 may be any component capable of storing programming and/or instructions for the processor 904. The cellular interface 910 may be any component or collection of components that allows the communications device 900 to communicate using a cellular signal, and may be used to receive and/or transmit information over a cellular connection of a cellular network. The supplemental wireless interface 912 may be any component or collection of components that allows the communications device 900 to communicate via a non-cellular wireless protocol, such as a Wi-Fi or Bluetooth protocol, or a control protocol. The device 900 may use the cellular interface 910 and/or the supplemental wireless interface 912 to communicate with any wirelessly enabled component, e.g., a base station, relay, mobile device, etc. The backhaul interface 914 may be any component or collection of components that allows the communications device 900 to communicate via a supplemental protocol, including wire-line protocols. In embodiments, the supplemental interface 914 may allow the device 900 to communicate with another component, such as a backhaul network component.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for communicating data using multiple media access control (MAC) access techniques, the method comprising:

obtaining, by a transmitter, a first traffic flow and a second traffic flow;

selecting a contention-based access MAC communication scheme to communicate the second traffic flow in response to determining that a maximum latency period associated with the second traffic flow is exceeded by a delay period associated with a scheduling-based access MAC communication scheme; and communicating, by the transmitter, the first traffic flow using a first spreading code associated with the scheduling-based access MAC communication scheme and the second traffic flow using a second spreading code associated with the contention-based access MAC communication scheme, the first traffic flow and the second traffic flow being communicated over the same network during the same time period, and the first spreading code being different than the second spreading code such that scheduling-based transmissions are separated from contention-based transmissions in the code domain.

2. The method of claim 1, wherein communicating the first traffic flow and the second traffic flow over the same network during the same time period comprises:
   transmitting at least a portion of the second traffic flow at the same time as at least a portion of the first traffic flow.

3. The method of claim 1, wherein selecting either the contention-based access MAC communication scheme or the scheduling-based access MAC communication scheme to communicate the second traffic flows comprises:
   selecting the contention-based access MAC communication scheme to communicate the second traffic flow when a percentage of overhead in the second traffic flow required to communicate the second traffic flow using the scheduling-based access MAC communication scheme exceeds a threshold.

4. The method of claim 1, wherein the first traffic flow and the second traffic flow are communicated over the same time-frequency resources.

5. The method of claim 1, wherein the delay period associated with the scheduling-based access MAC communication scheme varies based on how much traffic is waiting to be transmitted using the scheduling-based access MAC communication scheme or how many resources are reserved to scheduled transmissions.

6. The method of claim 1, wherein the delay period associated with the scheduling-based access MAC communication scheme varies based on how long it takes to obtain a resource assignment for a scheduled transmission.

7. An apparatus for communicating data using multiple media access control (MAC) access techniques, the apparatus comprising:
   a processor; and
   a computer readable storage medium storing programming for execution by the processor, the programming including instructions to:
      obtain a first traffic flow and a second traffic flow;
      select a contention-based access MAC communication scheme to communicate the second traffic flow in response to determining that a maximum latency period associated with the second traffic flow is exceeded by a delay period associated with a scheduling-based access MAC communication scheme; and
      communicate the first traffic flow using a first spreading code or a first frequency resource associated with the scheduling-based access MAC communication scheme and the second traffic flow using a second spreading code or a second frequency resource associated with the contention-based access MAC communication scheme, the first traffic flow and the second traffic flow being communicated over the same network during the same time period, and the first spreading code being different than the second spreading code such that scheduling-based transmissions are separated from contention-based transmissions in the code domain.

8. The apparatus of claim 7, wherein the instructions to select either the contention-based access MAC communication scheme or the scheduling-based access MAC communication scheme to communicate the second traffic flows includes instructions to:
   select the contention-based access MAC communication scheme to communicate the second traffic flow when a percentage of overhead in the second traffic flow required to communicate the second traffic flow using the scheduling-based access MAC communication scheme exceeds a threshold.

9. The apparatus of claim 7, wherein the first traffic flow and the second traffic flow are communicated over the same time-frequency resources.

10. A method comprising:
    determining media access control (MAC) selection criteria in accordance with conditions of a network; and
    communicating, by a communications controller, the MAC selection criteria to one or more mobile devices in the network, wherein the MAC selection criteria requires the mobile devices to communicate a given traffic flow during a time period using a first spreading code associated with a contention-based access MAC communication scheme or a second spreading code associated with a scheduling-based access MAC communication scheme based on a characteristic of the given traffic flow, the first spreading code being different than the second spreading code such that scheduling-based transmissions are separated from contention-based transmissions in the code domain, wherein the MAC selection criteria requires the mobile devices to communicate a given traffic flow using the contention-based access MAC communication scheme when a maximum latency period for the given traffic flow is exceeded by a delay period associated with the scheduling-based access MAC communication scheme.

11. The method of claim 10, wherein communicating the MAC selection criteria to the one or more mobile devices comprises:
    transmitting a unicast message to at least one mobile device in the network.

12. The method of claim 10, wherein communicating the MAC selection criteria to the one or more mobile devices comprises:
    transmitting a multicast message to at least one mobile device in the network.

13. The method of claim 10, wherein communicating the MAC selection criteria to the one or more mobile devices comprises:
    broadcasting a message to all mobile devices in the network.

14. The method of claim 10, wherein the MAC selection criteria requires the mobile devices to communicate a given traffic flow using the contention-based access MAC communication scheme when a percentage of overhead in the given traffic flow required to communicate the given traffic flow using the scheduling-based access MAC communication scheme exceeds a threshold.

15. A controller comprising:
    a processor; and
    a computer readable storage medium storing programming for execution by the processor, the programming including instructions to:
    determine media access control (MAC) selection criteria in accordance with conditions of a network; and
    communicate the MAC selection criteria to one or more mobile devices in the network, wherein the MAC selection criteria requires the mobile devices to communicate a given traffic flow during a time period using either a first spreading code associated with a contention-based access MAC communication scheme or a second spreading code associated with a scheduling-based access MAC communication scheme based on a characteristic of the given traffic flow, the first spreading code being different than the second spreading code such that scheduling-based transmissions are separated from contention-based transmissions in the code domain, wherein the MAC selection criteria requires the mobile devices to communicate a given traffic flow using the contention-based access MAC communication scheme when a maximum latency period for the given traffic flow is exceeded by a delay period associated with the scheduling-based access MAC communication scheme.

16. The controller of claim 15, wherein the MAC selection criteria requires the mobile devices to communicate a given traffic flow using the contention-based access MAC communication scheme when a percentage of overhead in the given traffic flow required to communicate the given traffic flow using the scheduling-based access MAC communication scheme exceeds a threshold.

17. A method for communicating data using multiple media access control (MAC) access techniques, the method comprising:
   obtaining, by a transmitter, a first traffic flow and a second traffic flow;
   selecting a contention-based access MAC communication scheme to communicate the second traffic flow when a maximum latency period for the second traffic flow is exceeded by a delay period associated with a scheduling-based access MAC communication scheme,
   selecting the scheduling-based access MAC communication scheme to communicate the first traffic flow when a maximum latency period for the first traffic flow is not exceeded by the delay period associated with the scheduling-based access MAC communication scheme and a total size of bundled packets of the first traffic flow exceeds a packet size associated with the scheduling-based access MAC communication scheme; and
   communicating the first traffic flow and the second traffic flow over a network during the same time period, wherein the first traffic flow is communicated using a first spreading code associated with the scheduling-based access MAC communication scheme, and wherein the second traffic flow is communicated using a second spreading code associated with the contention-based access MAC communication scheme, the first spreading code being different than the second spreading code such that scheduling-based transmissions are separated from contention-based transmissions in the code domain.

* * * * *